United States Patent [19]
Johnson

[11] Patent Number: 5,593,000
[45] Date of Patent: Jan. 14, 1997

[54] HYDROSTATIC TRANSAXLE

[75] Inventor: Alan W. Johnson, Ames, Iowa

[73] Assignee: Sauer Inc., Ames, Iowa

[21] Appl. No.: 658,747

[22] Filed: Jun. 5, 1996

Related U.S. Application Data

[63] Continuation of Ser. No. 182,769, Jan. 14, 1994, which is a continuation of Ser. No. 706,279, May 28, 1991, Pat. No. 5,505,279, which is a continuation of Ser. No. 482,656, Feb. 21, 1990, abandoned, which is a continuation of Ser. No. 319,164, Mar. 3, 1989, Pat. No. 4,903,545.

[51] Int. Cl.$^6$ ........................................................ B60K 7/00
[52] U.S. Cl. ............................ 180/305; 180/62; 180/307; 74/606 R; 74/487; 74/489
[58] Field of Search ................................ 180/53.4, 62, 63, 180/75, 305, 307, 905; 475/83; 60/487, 488, 489, 325, 530; 74/606 R, 730

[56] References Cited

U.S. PATENT DOCUMENTS

| | | |
|---|---|---|
| 1,136,363 | 4/1915 | Pepper . |
| 1,227,055 | 5/1917 | Kellogg . |
| 3,209,538 | 10/1965 | Kuze ........................................ 60/485 |
| 3,213,616 | 10/1965 | Reinke . |
| 3,360,933 | 1/1968 | Swanson et al. ............................ 60/53 |
| 3,411,296 | 11/1968 | Peterson ...................................... 60/53 |
| 3,430,438 | 3/1969 | Weiss . |
| 3,687,212 | 8/1972 | Forster . |
| 3,751,924 | 8/1973 | Brown et al. . |
| 3,944,010 | 3/1976 | Winter et al. . |
| 4,145,883 | 3/1979 | Forster . |
| 4,627,237 | 12/1986 | Hutson . |
| 4,784,013 | 11/1988 | Yamaoka et al. . |
| 4,856,264 | 8/1989 | Nishimura et al. . |
| 4,893,524 | 1/1990 | Okada . |
| 4,899,541 | 2/1990 | Okada et al. . |
| 4,905,472 | 3/1990 | Okada . |
| 4,914,907 | 4/1990 | Okada . |
| 4,922,787 | 5/1990 | Fujisaki et al. . |
| 4,932,209 | 6/1990 | Okada et al. . |
| 4,979,583 | 12/1990 | Thoma et al. . |
| 5,218,886 | 6/1993 | Louis et al. . |

Primary Examiner—Richard M. Camby
Attorney, Agent, or Firm—Zarley, McKee, Thomte, Voorhees, & Sease

[57] ABSTRACT

A hydrostatic transaxle having a common housing for a hydrostatic transmission and a pair of oppositely-extending differentially-connected axles has an L-shaped center section interconnecting the pair of hydraulic displacement units constituting the hydrostatic transmission. The center section is a unitary member separate from the common housing, and is mounted within the housing. The center section has passages and ports which are interconnected by certain passages and which are located whereby the center section may be cast. The center section has hydraulic pump and motor mounting surfaces on legs extending at right angles to each other. The pump has a vertical input shaft extending through the housing and an axis of rotation at right angles to a housing parting plane.

1 Claim, 3 Drawing Sheets

HYDROSTATIC TRANSAXLE

This application is a continuation of Ser. No. 08/182,769 filed Jan. 14, 1994; which is a continuation of U.S. application Ser. No. 706,279 filed May 28, 1991, now U.S. Pat. No. 5,505,279; which is a continuation of U.S. application Ser. No. 482,656 filed Feb. 21, 1990 (now abandoned), which is a continuation of U.S. application Ser. No. 319,164 filed Mar. 3, 1989, now U.S. Pat. No. 4,903,545 of which the following is a specification.

DESCRIPTION

1. Technical Field

This invention pertains to a center section for a hydrostatic transmission, with the hydrostatic transmission having particular utility as a component of an integrated hydrostatic transaxle. A transaxle of a type used in equipment, such as a lawn tractor, has gear reduction and axle components mounted in a housing providing a sump for lubricating oil. The disclosed center section is directed toward an economical integration of the hydrostatic transmission with the transaxle components in a common housing providing a common sump.

2. Background Art

Hydraulically driven equipment, such as a lawn tractor, have had transaxle structure mounted in a housing including a drive input connection, a gear reduction drive, and oppositely-extending differentially-connected axles, and a hydrostatic transmission is connected to the exterior of the housing whereby a drive output from the hydrostatic transmission connects to the drive input to the transaxle structure.

The known prior are structures have not integrated the hydrostatic transmission with the transaxle components in a common housing to provide a common sump and with the use of a unique center section between the hydraulic components of the hydrostatic transmission as disclosed herein.

A hydrostatic transmission has a pair of hydraulic displacement units with fluid connections therebetween. In a typical hydrostatic transmission, the hydraulic displacement units each have a rotatable cylinder block mounting a plurality of reciprocal pistons and with the piston-receiving chambers in the cylinder block communicating with ports for fluid flow to and from the piston-receiving chambers. Many different types of structure are known for achieving fluid communication between the arcuate ports associated with the pair of rotatable cylinder blocks. Such structure can be by means of tubing or by means of a structural section with fluid passages and positioned adjacent both rotatable cylinder blocks. This structural section can be either integral with a housing for the hydrostatic transmission or a separate component mountable between the hydraulic displacement units and separable from the housing.

A prior art hydrostatic transmission has a pair of hydraulic displacement units generally in side-by-side relation and with a rotatable cylinder block of each of the hydraulic displacement units being associated with a structural section having arcuate ports for association with both of the hydraulic displacement units. A pair of generally parallel straight passages, formed in the structural section intersect and communicate with the arcuate ports in pairs whereby there is fluid communication between a pair of arcuate ports associated one with each of the hydraulic displacement units.

The prior art also includes hydrostatic transmissions wherein the hydraulic displacement units are disposed at a selected fixed angle relative to each other whereby the axes of rotation of the rotatable cylinder blocks thereof are at an angle to each other and a structural section disposed therebetween has had a pair of faces at the selected angle whereby arcuate ports associated therewith may coact with the angularly-related cylinder blocks of the hydraulic displacement units.

DISCLOSURE OF THE INVENTION

The integrated hydrostatic transaxle disclosed herein has resulted from efforts to reduce the cost, size and weight of a transaxle package which has had a non-integrated relation between the housings for a hydrostatic transmission and the gear reduction, differential and axle components. Elimination of as much machining as possible contributes substantially to cost reduction.

A primary feature of the invention is to provide a one-piece, generally L-shaped center section for a hydrostatic transmission which is positionable in a housing and has first and second faces for coaction with rotatable cylinder blocks of a pair of hydraulic displacement units of the hydrostatic transmission and with the center section designed to require a minimal amount of machining to the body thereof with resultant maximum cost savings.

The lowest possible machining cost for the center section can be achieved by going to a casting process, such as die casting or the lost foam process. A casting process results in a more porous center section and, with passages therein having fluid at high pressure, it is important to assure that leakage from the center section shall not be a problem.

The one-piece generally L-shaped center section being separable from the housing for the hydrostatic transmission and mountable therein permits casting of the center section since leakage from a porous cast center section will leak into a sump defined by the housing for the hydrostatic transmission, rather than through a wall of the housing.

An object of the invention is to provide, in combination, a hydrostatic transmission comprising a pair of hydraulic displacement units each having a rotatable cylinder block with reciprocal pistons and a housing for the displacement units providing a fluid sump along with a unique, one-piece, generally L-shaped center section positionable in the housing to facilitate utilization of such a structure with drive components for a hydraulically-driven device all in a common housing having a common sump.

Additionally, the center section of the hydrostatic transmission is uniquely designed with passages in addition to first and second generally straight passages interconnecting the hydraulic displacement units to provide for mounting of bypass valves as well as delivery of make-up oil to the hydraulic circuit and provide for bleed of air from the hydraulic circuit during operation of the bypass valves.

A further object of the invention is to provide, in combination, a hydrostatic transmission comprising a pair of hydraulic displacement units each having a rotatable cylinder block with reciprocal pistons, and a housing for said displacement units providing a fluid sump, said rotatable cylinder blocks having their axes of rotation generally normal to each other, a one-piece generally L-shaped center section positionable in said housing and having first and second faces generally at right angles to each other, said center section being positioned to have said first face engage an end of one rotatable cylinder block and the second face engage an end of the other rotatable cylinder block, arcuate fluid ports at the face of each of said center section faces for coaction with a rotatable cylinder block, a first straight fluid passage in said center section connecting one of the ports at each face to define a pair of fluid communicating ports and terminating at one of said pair of ports, and a second straight fluid passage in said center section connecting another of the ports on each face to define a second pair of fluid communicating ports and terminating at one of the ports of said second pair.

Another feature of the invention is to provide an integrated hydrostatic transaxle having a common housing for a hydrostatic transmission and a pair of oppositely-extending, drivingly connected axles to provide a common sump, with the hydrostatic transmission having the center section as described in the preceding paragraphs. Cost effectiveness is achieved by use of the common housing, common sump and one-piece center section whereby leakage from the hydrostatic transmission including from a fluid passage in the center section containing fluid pressure may reach the common sump at atmospheric pressure. This makes it possible to cast the center section and minimize costly machining even though the center section may be more porous.

An object of the invention is to provide an integrated hydrostatic transaxle having the structure referred to in the preceding paragraph.

Still another object of the invention is to have, in combination, a hydrostatic transmission comprising a pair of hydraulic displacement units each having a rotatable cylinder block with reciprocal pistons, and a housing for said displacement units providing a fluid sump, said rotatable cylinder blocks having their axes of rotation normal to each other, a one-piece L-shaped center section separate from said housing and having first and second faces at right angles to each other, said center section being positioned to have said first face engage an end of one rotatable cylinder block and the second face engage an end of the other rotatable cylinder block, each of said center section faces having arcuate fluid ports for coaction with a rotatable cylinder block, a first straight fluid passage in said center section connecting one of the ports on each face and terminating at one of said ports, a second straight fluid passage in said center section connecting another of the ports on each face and terminating at one of said ports, said center section being of material which may be sufficiently porous to permit leakage of high pressure fluid from whichever one of said straight fluid passages contains high pressure fluid with said leakage flowing to said fluid sump, and said center section having third and fourth straight fluid passages intersecting said first and second fluid passages, respectively, and opening to a surface of said center section opposite to one of the faces thereof for mounting of check valves.

Still another object of the invention is to have the combination as set forth in the preceding paragraph wherein said first and second fluid passages are generally parallel, said center section has a through bore extending perpendicular to and positioned between said first and second fluid passages, a fifth fluid passage extending generally parallel to and positioned between said first and second fluid passages and opening to said bore for delivery of make-up fluid to said bore, and a sixth fluid passage extending between the fifth fluid passage and a recess set back from the surface to which the third and fourth fluid passages open for communication with a source of filtered make-up fluid.

DESCRIPTION OF THE PREFERRED EMBODIMENT

Figure 1:
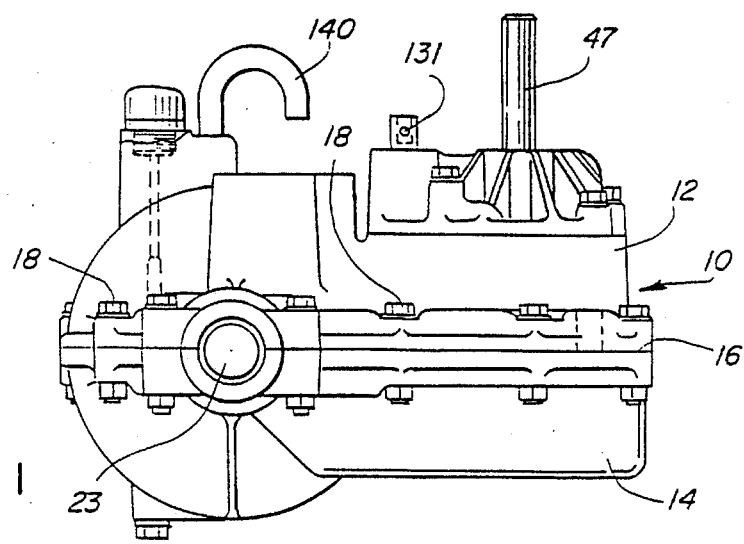
FIG. 1 is a side elevation view of the integrated hydrostatic transaxle, taken looking toward the left in FIG. 2.
Figure 2:
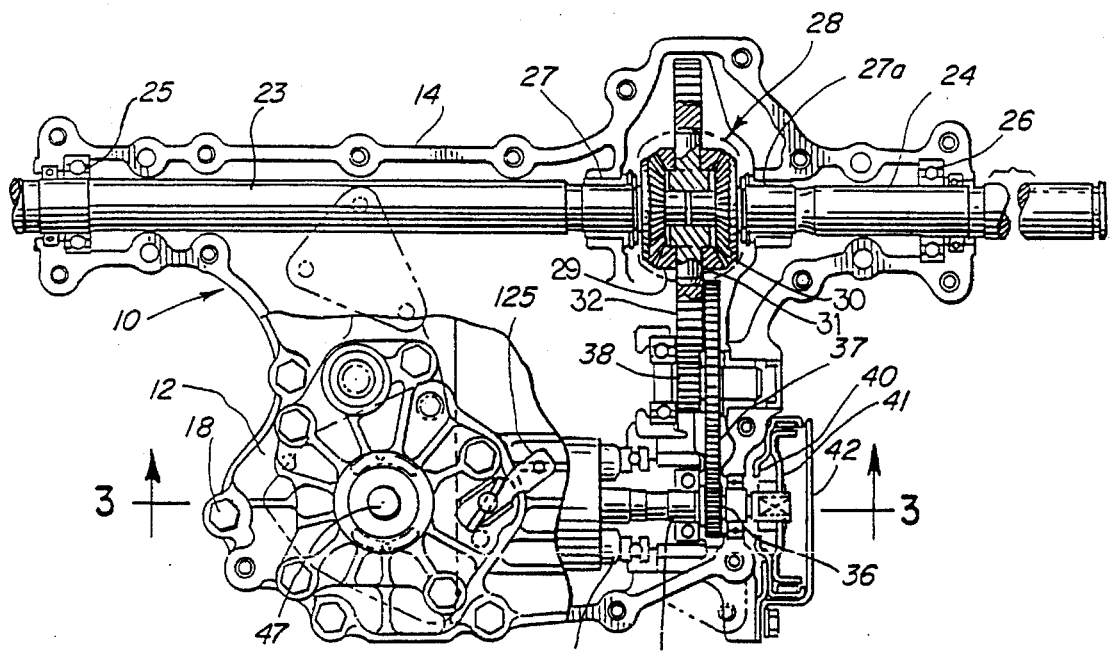
FIG. 2 is a plan view of the integrated hydrostatic transaxle, with parts broken away.
Figure 3:
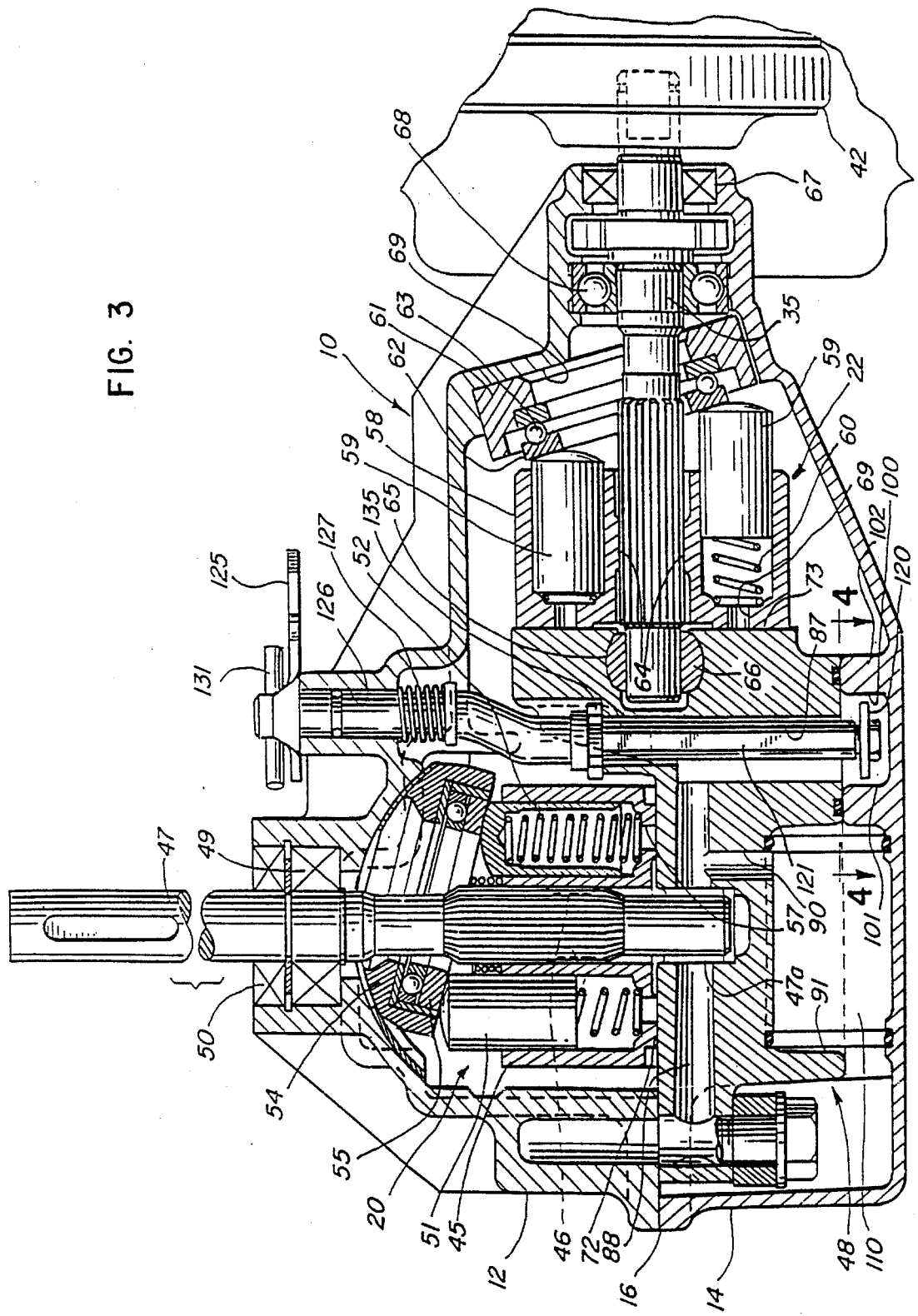
FIG. 3 is a vertical section, taken generally along the line 3—3 in FIG. 2, and on an enlarged scale.

The integrated hydrostatic transaxle is shown generally in FIGS. 1 to 3.

The integrated hydrostatic transaxle has a common housing 10 for the components thereof. The common housing 10 is of two pairs, with a top part 12 and a bottom part 14 which are joined together along a split line 16 which is disposed generally horizontal when the integrated hydrostatic transaxle is installed in operative position. The housing parts 12 and 14 are held in assembled relation by a series of bolts 18 extending through peripheral flanges of the top and bottom housing parts which abut at the split line 16.

The shape of the housing parts in plan is shown in FIG. 2 wherein a portion of the top housing part 12 is seen in the lower left part of the Figure and with the remainder thereof broken away to show the bottom housing part 14.

The common housing 10 encloses a hydrostatic transmission having a pair of hydraulic displacement units, indicated generally at 20 and 22, respectively, and also houses transaxle components, seen particularly in FIG. 2. The transaxle components include a pair of oppositely-extending axles 23 and 24 having ends extended beyond the bottom housing part for mounting of drive wheels (not shown) and their centerlines are coincident with the housing split line 16. The bottom housing part 14 has bearings 25 and 26 at the outboard ends and thrust bearings 27 and 27a at the inboard ends of the axles for rotatable support thereof and with the axles being geared together through a differential, indicated generally at 28. This differential includes bevel gears 29 and 30 at the inner end of the respective axles 23 and 24 with drive input gears thereto including a gear 31 which meshes with an output gear 32 of a gear reduction drive. The gear reduction drive has a drive input connection from the hydraulic displacement unit 22, with the output shaft 35 (FIG. 3) of the latter having a gear 36 which meshes with a gear 37. The latter gear is rotatably fixed to a gear 38 which meshes with the previously-mentioned gear 32.

A brake for the drive is mounted externally of the common housing 10 and associated with an end of the drive output shaft 35, with this brake structure, including a brake 40, a brake drum 41 and a brake cover 42.

Each of the hydraulic displacement units 20 and 22 is shown in detail in FIG. 3 and is of generally the same construction. The hydraulic displacement unit 20 has a rotatable cylinder block 45 connected by a splined connection 46 to a drive input shaft 47 having an internal end rotatable in a journal 47a positioned in a center section, indicated generally at 48, of the hydrostatic transmission. The outboard end of the drive input shaft 47 is rotatably supported by the top housing part 12 by means of a bearing 49. A lip seal 50 seals the shaft opening in the top housing part 12.

The rotatable cylinder block 45 has a series of piston-receiving chambers, each of which movably mount a piston 51 of a relatively large diameter and with each of the pistons 51 being urged by an associated spring 52 into following engagement with a swashplate structure. The hydraulic displacement unit 20 has overcenter variable displacement, with this operation being achieved by angular adjustment of a swashplate 54 which, as well known in the art, can have its angle varied from the clockwise position shown in FIG. 3 to an opposite extreme position in a known manner and by manually operable structure, not shown. The swashplate can pivot about a pivot axis in a counterclockwise direction and past a horizontal center position, as viewed in FIG. 3. The swashplate 54, as known in the art, mounts a thrust plate 55 against which the pistons abut and a bearing and bearing guide structure rotatably support the thrust plate 55 relative to the body of the swashplate.

Each of the piston-receiving chambers has a passage 57 opening to a face of the rotatable cylinder block 45 for coaction with arcuate ports of the center section 48 which will be described subsequently.

The hydraulic displacement unit 22 is a fixed displacement unit and has a rotatable cylinder block 58 with a plurality of piston-receiving chambers each movably mounting a piston 59 which is spring-urged by a spring 60 toward a swashplate 61. The swashplate 61 has a thrust plate 62 against which an end of the pistons engages and a ball thrust bearing 63 interposed between the thrust plate and the swashplate to rotatably mount the thrust plate.

The rotatable cylinder block 58 drives the drive output shaft 35 through a splined connection 64 therebetween.

Figure 11:
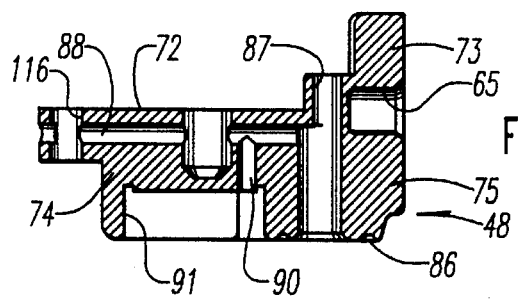
FIG. 11 is a vertical section of the center section, taken generally along the line 11—11 in FIG. 8 and with the structure associated with the center section being omitted.

An inner end of the drive output shaft 35 rotates within an opening 65 in the center section 48 which may optionally receive a journal 66 and, if the journal is not used, the opening 65 is cylindrical as shown in FIG. 11. The outboard end of the drive output shaft 35 is sealed by a lip seal 67 and with bearing structure disposed interiorly thereof including a ball bearing 68.

Each of the piston-receiving chambers of the rotatable cylinder block 58 has a passage 69 opening to a face thereof which coact with arcuate ports associated with a face of the center section 48 to be subsequently described.

Since the hydraulic displacement unit 22 is of a fixed displacement, the swashplate 61 need not be adjustably mounted and, therefore, can be supported by the common housing 10 against hydraulic forces exerted through the pistons 59. As seen in FIG. 3, the centerline of the drive output shaft 35 is located on the split line 16 of the housing parts 12 and 14 and extends through a central opening 69 in the swashplate 61. The swashplate 61 spans the split line and support thereof against fluid forces is provided by the common housing at both sides of the split line.

The foregoing description generally describes the integrated hydrostatic transaxle wherein the bottom housing part 14 provides a common sump for the transaxle components as is evident in FIGS. 1 and 2 and also for the hydrostatic transmission as is evident from FIGS. 1 to 3.

The hydraulic displacement units 20 and 22 have their respective rotatable cylinder blocks arranged with their axes of rotation generally at right angles to each other. It is the primary function of the center section 48 to provide communication between selected piston-receiving chambers of the respective cylinder blocks 45 and 58. In achieving this primary function, center section 48 has been uniquely designed to minimize costly machining operations and enable formation of the body of the center section by casting. Examples of such casting, without limitation, are lost foam casting and die casting. The resulting material of the cast body of the center section has a relatively high degree of porosity as compared to a conventional machined center section for a hydrostatic transmission and in order to assure any leakage problem of high pressure fluid contained within a passage in the center section, because of porosity, is confined within the common housing, the center section 48 has been constructed as a separate one-piece center section which is positionable within the bottom housing part 14 as seen in FIG. 3. The one-piece center section 48 is generally L-shaped to have a pair of faces generally at right angles to each other with one planar face 72 coating with a face of the rotatable cylinder block 45 of the variable displacement unit 20 and a second planar face 73 coacting with a face of the rotatable cylinder block 58 of the hydraulic displacement unit 22. The center section body has two integral parts 74 and 75 oriented to have the two parts define the legs of the L shape of the center section, with the part 74 having the planar face 72 and the part 75 having the planar face 73.

Figure 8:
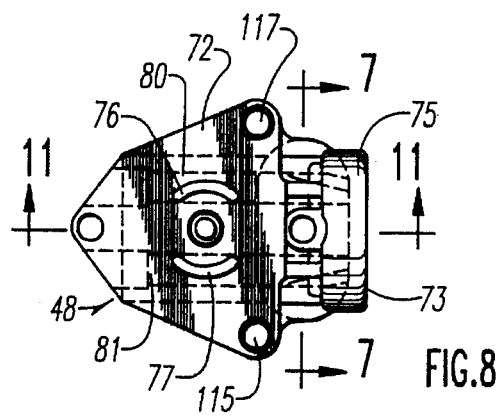
FIG. 8 is a top view of the center section for the hydrostatic transmission.
Figure 10:
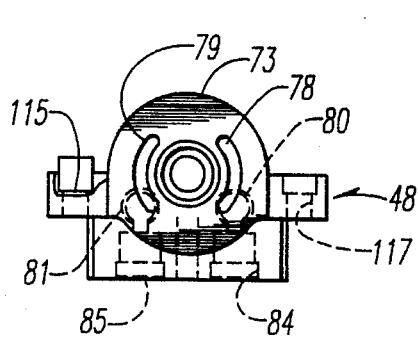
FIG. 10 is a side elevation of the center section, looking toward the right side thereof, as shown in FIG. 8.
Figure 9:
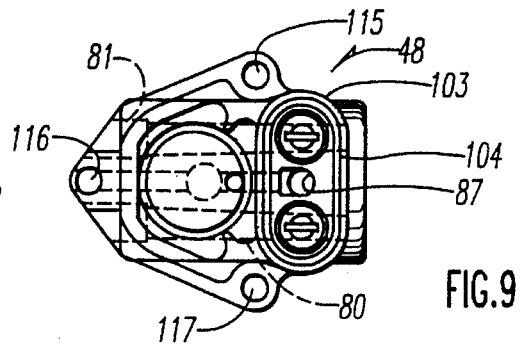
FIG. 9 is a bottom view of the center section of the hydrostatic transmission.

The planar face 72 has a pair of arcuate ports 76 and 77 and the planar face 73 has a pair of arcuate ports 78 and 79, as seen in FIGS. 8 and 10, respectively.

First and second straight, generally parallel passages 80 and 81 are cast into the center section body and function to intersect the arcuate ports and place the arcuate ports in paired relation for fluid communication. The first passage 80 intersects with arcuate port 76 and arcuate port 78 to provide a first pair of ports in fluid communication. The second passage 81 intersects arcuate ports 77 and 79 and places them in paired fluid communication.

In operation of the integrated hydrostatic transaxle, one or the other of the first and second fluid passages functions to deliver fluid under pressure from the variable displacement unit 20 functioning as a pump to the fixed displacement unit 22, functioning as a motor, and with the other fluid passage providing for return of fluid from the motor to the pump. The first and second fluid passages 80 and 81 terminate at one end at their intersection with the arcuate ports 78 and 79 and are closed at their other end as formed in the casting process.

The center section 48 has a third passage 84 intersecting said first passage 80 and a fourth passage 85 intersecting the second passage 81, with the passages 84 and 85 opening to a surface 86 of the center section opposite to the planar face 72.

A through bore 87 extends perpendicular to and is positioned between the first and second fluid passages 80 and 81 and a fifth fluid passage 88, sealed intermediate its ends by Journal 47a, extends generally parallel to the through bore 87 and is positioned between the first and second fluid passages 80 and 81. A sixth fluid passage 90 extends between and normal to the fifth fluid passage 88 and a recess 91 in the center section set back from the surface 86 of the center section.

The utility of the through bore and third through sixth passages will be readily understood by reference to FIGS. 3 to 7 and the following description.

The third and fourth fluid passages 84 and 85 mount a pair of check valves which each having a tubular seat member 93 and 94, respectively, fitted therein and which form seats for a pair of check valve balls 95 and 96 spring-urged downwardly against the seats. The check valves function, when closed, to block fluid flow from either of the first and second passages 80 and 81 to a recess or well 100 (FIG. 3) formed by a cavity in the bottom housing port 14. This recess is generally oval and is defined by a continuous upstanding wall on the bottom housing part with wall sections shown at 101 and 102. The lower ends of the third and fourth passages 84 and 85 open into this generally oval recess. The oval recess 100 is sealed off, at its top, by a generally oval-shaped wall 103 on the underside of the center section 48 and which has a sealing O-ring 104 therebetween. This is a sealed recess or well so that filtered fluid in the recess may be a source of make-up fluid to the hydrostatic transmission. Structure associated with the check valves also provides for a bypass function wherein, even though the pump is set at a displacement and is operable, there is no drive of the motor since the first and second passages 80 and 81 are cross-connected through opening of the check valves and the generally oval recess 100.

The make-up fluid is delivered to the generally oval recess 100 from the common sump within the bottom housing part 14 by flow through an open space beneath the center section 48 (FIG. 3 ) and through a cylindrical filter 110 having O-ring seals at its top and bottom. The interior of the filter 110 communicates with the sixth fluid passage 90 in the center section. As previously described, the sixth fluid passage 90 communicates with the fifth fluid passage 88 and the fifth fluid passage 88 communicates with the through bore 87 so that fluid reaches the recess 100.

The center section has a series of through mounting holes at 115, 116, and 117 whereby, as seen in FIG. 3, in assembly, the center section 48 can be secured to the upper housing part 12, as by self-tapping screws 118 and the final assembly achieved by bringing the bottom housing part 14 into association with the top housing part 12 along the split line 16.

All of the first through sixth fluid passages of the center section as well as the through bore 87, recess 65, recess 91 and through mounting holes 115–117 can be formed in the center section in a casting process. There is only a limited amount of machining required to finish the center section. As previously stated, a cast center section has a higher porosity than a conventional machined center section, which could create the possibility of leakage from whichever of the first and second passages 80 and 81 may have pressure fluid therein; however, the one-piece, integral center section which is independent of the housings avoids any problem from such leakage since such leakage would merely be into the common sump of the integrated hydrostatic transaxle and which is open to atmosphere through a bleed tube 140.

Figure 4:
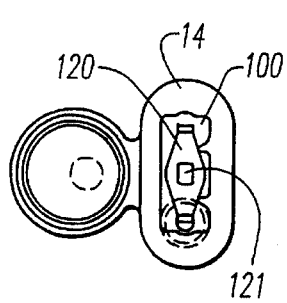
FIG. 4 is a fragmentary section of the bottom part of the housing and structure related thereto, as shown generally along section 4—4 in FIG. 3.
Figure 5:
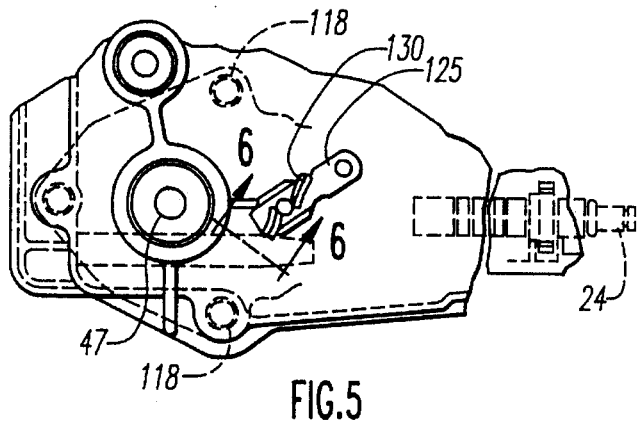
FIG. 5 is a fragmentary plan view of structure shown in FIG. 2.
Figure 6:
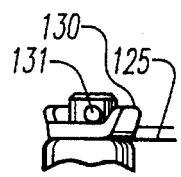
FIG. 6 is a fragmentary section, taken generally along the line 6—6 in FIG. 5.
Figure 7:
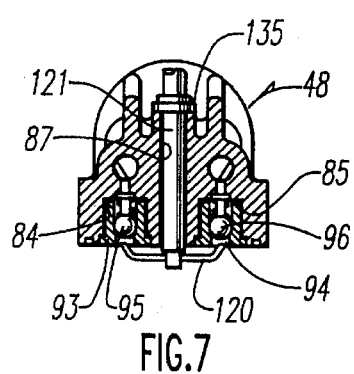
FIG. 7 is a vertical section of the center section, taken generally along the line 7—7 in FIG. 8 and with check valve and bypass structure shown in association therewith.

The bypass operation previously referred to is effected by opening the check valves by raising the check valve balls 95 and 96 off their seats. The structure for this includes a bypass actuator structure including a bypass actuator plate 120 and a bypass rod 121. The bypass actuator plate 120, as seen in FIGS. 4 and 7, is positioned in the generally oval recess 100 in the bottom housing part 14 and, at its middle, is connected to the lower end of the bypass rod 121 and has a pair of upturned ends (FIG. 7) positioned beneath the check valve balls 95 and 96. Lifting of the bypass rod 121 causes the bypass actuator plate to lift the check valve balls and place the center section first and second passages 80 and 81 in fluid communication. Lifting of the bypass rod 121 is achieved by rotation of a handle 125 positioned above top housing part 12 and, as seen particularly in FIGS. 2, 3 and 5. The bypass rod 121 is longitudinally movable in an opening 126 in the top housing part 12 as well as having its lower part extending downwardly through the through bore 87 of the center section and is normally urged downwardly by a spring 127. As seen in FIG. 6, the handle 125 has cam shapes 130 formed thereon which coact with ends of a through pin 131 fitted into an end of the bypass rod 121. Rotation of the handle 125 from the position shown in the drawings to bring the camel 130 under the through pin 131 raises the through pin and the bypass rod 121 to establish the bypass operation.

The bypass rod 121 and center section 48 are uniquely associated with the housing structure whereby a bypass operation also results in bleeding air from the system fluid. When the bypass rod 121 is in its lower position and the check valves are closed, the upper end of the through bore 87 of the center section 48 is closed by a seal washer 135 backed up by peripheral flange on the bypass rod, so that there is no fluid communication between the through bore 87 and the interior of the common housing 10. When the bypass rod 121 is raised to effect a bypass operation, the seal washer 135 is moved upwardly from its seat whereby the upper end of the through bore 87 is open to the interior of the common housing and air can bleed off to the housing interior. Air that accumulates in the common sump can bleed off to atmosphere through the bleed tube 140 (FIG. 1).

It is believed that the operation of the integrated hydrostatic transaxle is clearly apparent from the foregoing description. However, it may be briefly summarized as follows. An engine drives the drive input shaft 47 for the variable displacement unit 20 (functioning as a pump) to cause operation of the displacement unit 22 (functioning as a motor) and the drive output shaft 35 drives the transaxle components shown in FIG. 2 for rotation of the wheel axles 23 and 24. The direction of rotation of the wheel axles can be shifted from forward to reverse by shifting the swashplate 54 of the variable displacement unit 20 to a position opposite side of center from that shown in FIG. 3 and with resulting reversal of pressure fluid flow through the center section 48 from the pump to the motor. In the event there is to be no rotation of the wheel axles 23 and 24 while the pump is still operating and set for displacement, a bypass operation is achieved by rotation of the handle 125 to raise the bypass rod 121 and open the check valve balls 95 and 96. As previously mentioned, any air in the passages in the center section can bleed to the sump of the common housing. Either one of the check valves can automatically open to provide make-up fluid to the transmission circuit from the generally oval recess 100 when the pressure existing in one or the other of the first and second straight passages 80 and 81 in the center section is sufficiently less than that of the fluid in the oval recess to overcome the spring closing force on a check valve ball.

I claim:

1. A hydrostatic transaxle having a housing with an interior cavity, an axle assembly in said housing including a differential assembly, the improvement comprising, a hydrostatic transmission mounted within said cavity and including a generally L-shaped member completely housed within said cavity and having first and second hydrostatic unit mounting surfaces thereon disposed at right angles to each other, at least a pair of fluid ports in each of said mounting surfaces, and internal passageways in said L-shaped member connecting at least one of said fluid ports on one of said mounting surfaces with at least one of said fluid ports on the other of said mounting surfaces, said L-shaped member comprising first and second legs integrally joined and extending at right angles to each other, said first leg having first and second opposite surfaces with said first mounting surface being located on said first surface, said second leg having a first surface extending at right angles away from the first surface of said first leg, and a second surface opposite to the first surface of said second leg with the other of said mounting surfaces being on said second surface of said second leg, said L-shaped member having means for accommodating the mounting thereof within the interior cavity of said housing, and means for operatively connecting said hydrostatic transmission to said differential assembly, a hydrostatic pump having an axis of rotation mounted on one of said mounting surfaces, and an input shaft extending through said housing and drivably connected to said hydrostatic pump, said input shaft being positioned on the axis of rotation of said hydrostatic pump.

* * * * *